United States Patent
Chiappa

[11] Patent Number: 5,692,829
[45] Date of Patent: Dec. 2, 1997

[54] METHOD AND APPARATUS FOR FLUIDISING A MIXTURE OF SOLID PARTICLES DISPERSED IN A CONTINUOUS LIPID PHASE

[75] Inventor: Ottorino Chiappa, Milan, Italy

[73] Assignee: Mazzoni LB Food S.r.l., Varese, Italy

[21] Appl. No.: 610,667

[22] Filed: Mar. 4, 1996

[30] Foreign Application Priority Data

Mar. 9, 1995 [EP] European Pat. Off. .............. 95830086

[51] Int. Cl.⁶ .................. B01F 3/12; B01F 7/10
[52] U.S. Cl. ........................... 366/303; 366/306
[58] Field of Search ................. 366/64–66, 96–99, 366/194–196, 303, 305, 307, 315, 316, 317, 176.1, 306

[56] References Cited

U.S. PATENT DOCUMENTS

| | | | |
|---|---|---|---|
| 4,042,721 | 8/1977 | Ziccarelli . | |
| 4,194,841 | 3/1980 | Tadmor | 366/307 X |
| 4,255,059 | 3/1981 | Hold et al. | 366/307 X |
| 4,413,913 | 11/1983 | Hold et al. . | |
| 4,421,412 | 12/1983 | Hold et al. | 366/307 X |
| 4,549,810 | 10/1985 | Mehta | 366/307 X |
| 4,582,432 | 4/1986 | Mehta | 366/307 X |
| 5,466,334 | 11/1995 | Fredriksson eet al. | 366/307 X |
| 5,538,343 | 7/1996 | Tynan | 366/305 |

FOREIGN PATENT DOCUMENTS

| | | |
|---|---|---|
| 2444499 | 7/1980 | France . |
| 2444548 | 7/1980 | France . |
| 995984 | 6/1965 | United Kingdom . |

Primary Examiner—Charles E. Cooley
Attorney, Agent, or Firm—Kinney & Lange, P.A.

[57] ABSTRACT

A fluidising apparatus for a mixture of solid particles dispersed in a continuous lipid phase, which allows the mixture to be fluidised rapidly, comprises a casing that defines an annular chamber having an inlet aperture and an outlet aperture, and a rotor that functions within the annular chamber to transfer mechanical energy to the mixture, a baffle being inserted in the annular chamber to render unusable one arc of the annular chamber and to create an obligatory pathway for the mixture in the remaining arc of the annular chamber which extends between the above-mentioned apertures.

9 Claims, 3 Drawing Sheets

METHOD AND APPARATUS FOR FLUIDISING A MIXTURE OF SOLID PARTICLES DISPERSED IN A CONTINUOUS LIPID PHASE

FIELD OF THE INVENTION

The present invention concerns an apparatus for fluidising a mixture of solid particles dispersed in a continuous lipid phase, in particular chocolate and its derivatives, of a type comprising a casing that defines an annular chamber having an inlet aperture and an outlet aperture.

With the sole intention of explaining the present invention in a simple way, the following description refers in a non-limitative way to chocolate, in which sugar and cocoa are solid particles dispersed in a continuous phase of cocoa butter.

BACKGROUND OF THE INVENTION

In chocolate production, the mixture must be fluidised since the initial viscosity of the mixture hinders the workability of the chocolate and its movement by pumping. The viscosity of the mixture is reduced by mechanical agitation. It is appropriate to emphasise that the energy supplied to the mixture by this mechanical action must be kept below the threshold that would cause the grinding down of the solid particles since the degree of refinement of the mixture's solid particles is achieved in a previous grinding phase.

To make the chocolate fluid, fluidising apparatus are currently used through which the mixture passes. Such fluidisers comprise a rotor with peripheral blades that act on the mixture.

Although substantially answering the purpose, such fluidising apparatus take a long time to reduce the viscosity of the mixture significantly. In fact, such apparatus are scantily efficient and the mixture must circulate many times through them in order to attain the aforesaid reduction in viscosity. On the other hand, the solution of using more fluidisers arranged in series gives rise to setting-up problems and an increase in installation and running costs.

The problem at the root of the present invention is to devise a fluidiser that renders the mixture fluid in less time than the prior art fluidisers.

SUMMARY OF THE INVENTION

This problem is resolved in accordance with the invention by a fluidising apparatus of the type specified, characterised in that it includes a baffle within the annular chamber for rendering unusable an arc of the annular chamber and for making the remaining arc of the annular chamber that extends between the inlet aperture and the outlet aperture obligatory pathway for the mixture, obstacles, preferably in the form of blades, being provided in the obligatory pathway to the flow of the mixture.

The solution upon which the present invention is based is to force the mixture along a particular route in which obstacles are provided to oppose its passage.

BRIEF DESCRIPTION OF THE DRAWINGS

To provide an understanding of the invention and its advantages a detailed description of a preferred embodiment is given below by way of non-limitative example, with reference to the accompanying drawings in which.

DETAILED DESCRIPTION OF THE PREFERRED EMBODIMENT

Figure 1:
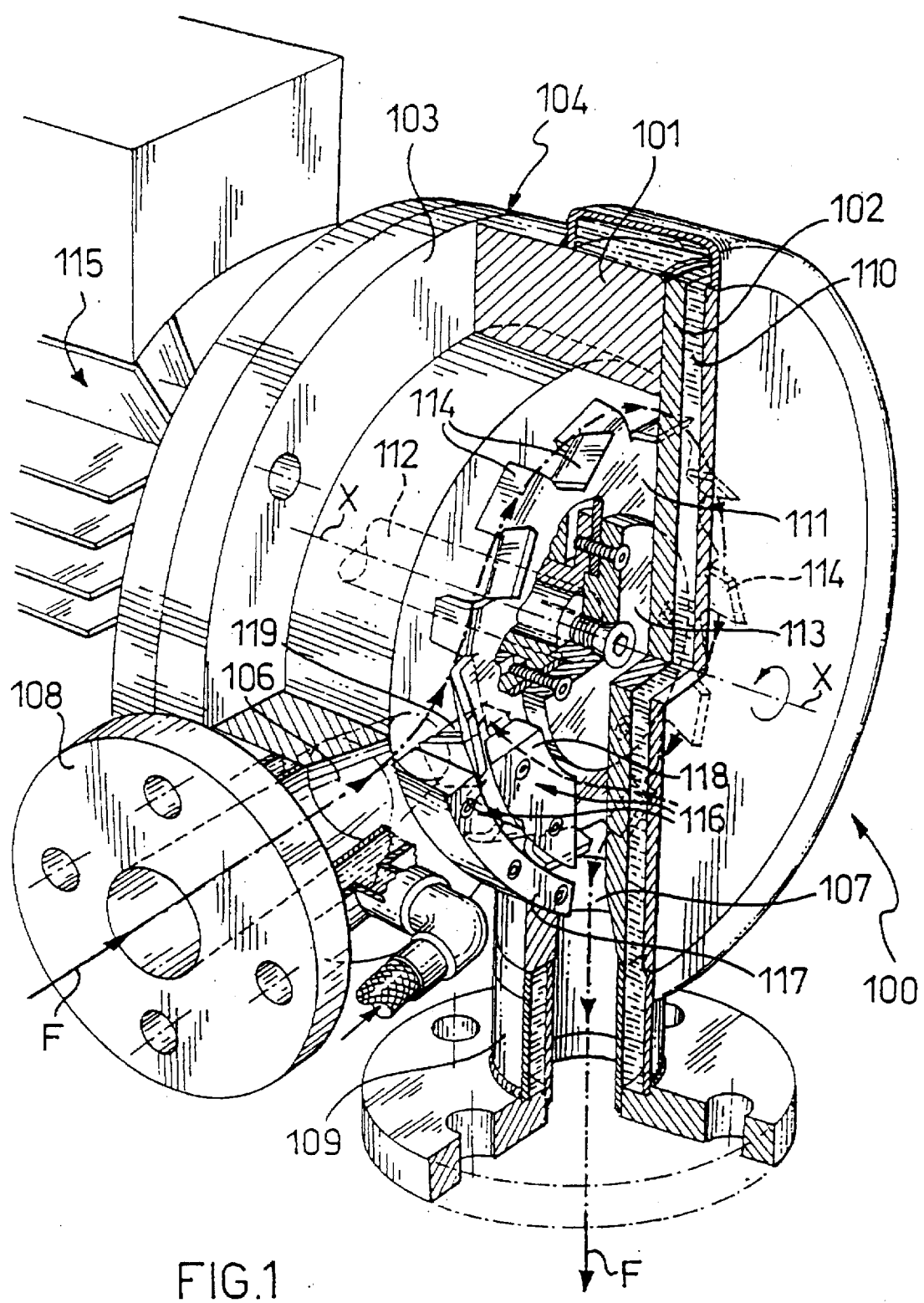
FIG. 1 is a perspective view in partial section of a fluidising apparatus according to the present invention.
Figure 2:
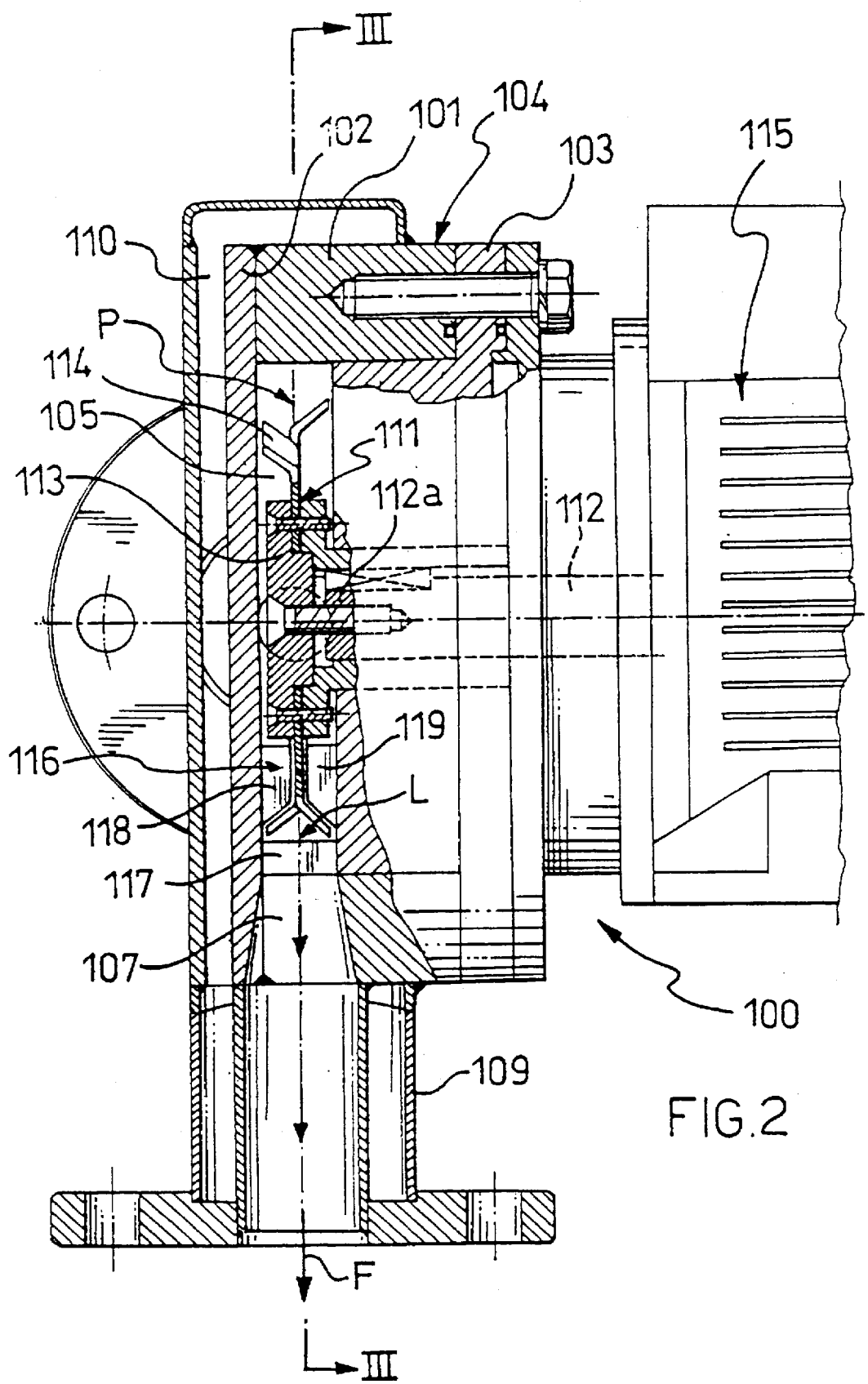
FIG. 2 is a sectional view of the apparatus of FIG. 1.
Figure 3:
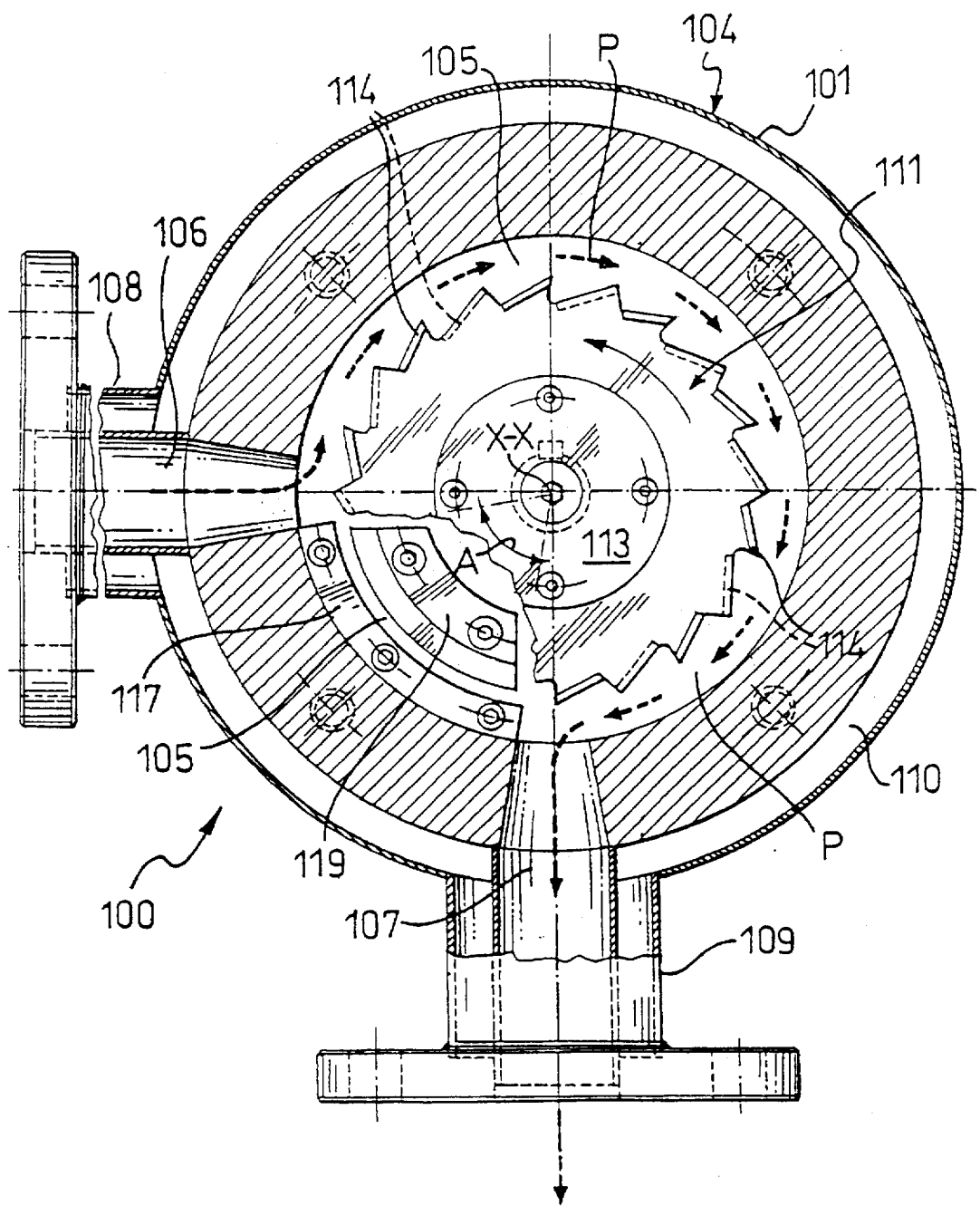
FIG. 3 is a sectional view of the apparatus in FIG. 1 taken on the line III—III in FIG. 2.

With reference to the drawings, fluidising apparatus for fluidising a mixture of solid particles dispersed in a continuous lipid phase is generally indicated 100. The description is made with reference to chocolate, in which solid particles of sugar and cocoa are dispersed in a lipid phase of cocoa butter.

The fluidising apparatus 100 comprises an annular body 101 having an axis X—X and having an end wall 102 and sealed by a cover 103 at its opposite end. The annular body 101, the end wall 102 and the cover 103 form a casing 104 which delimits an annular chamber 105.

The casing 104 is preferably of stainless steel and has an inlet aperture 106 and an outlet aperture 107 from which respective flanged sleeves 108 and 109 project outwardly of the casing 104. The flanged sleeves 108 and 109 are in fluid communication with tubular ducts not shown. Preferably the apertures 106 and 107 are arranged in the periphery of the annular body 101 on respective radii.

The annular body 101 has an outer interspace 110 through which water is circulated from a thermostatically-regulated hydraulic circuit not shown.

Within the annular chamber 105 is a rotor 111 driven by an electric motor 115. In particular the rotor 111 is keyed coaxially onto a first end $112_a$ of a shaft 112 which is rotatably inserted through the cover 103 into the casing 104, coaxially of the annular body 101. The opposite end of the shaft 112 is connected to the motor 115.

The rotor 111, in itself conventional, comprises a disc with a plurality of peripheral blades or obstacles 114 carried on a hub 113. The blades 114 are able to fluidise the mixture by providing mechanical energy in the form of cutting forces.

A baffle 116 is inserted in the annular chamber 105 astride the rotor 111 so as to render one arc of the annular chamber 105 unusable and to create an obligatory pathway P for the mixture along a further arc extending from the inlet aperture 106 to the outlet aperture 107. The apertures 106 and 107 are arranged on either side of the baffle 116 at a predetermined angle A, preferably 90°. The aforesaid obligatory pathway P thus extends through an angle of 270°.

The baffle 116 comprises portions 117, 118 and 119 extending along circumferential arcs concentric with the axis X—X and fixed to the annular body 101, the end wall 102 and the cover 103 respectively. These portions define an opening L for the passage of the rotor 111.

In operation of the fluidising apparatus 100, a flow F of chocolate is conveyed into the annular chamber 105 through the flanged sleeve 108. The baffle 116 deflects the flow F into the obligatory pathway P where the peripheral blades 114 of the rotor 111 act as obstacles to the passage of the mixture. After having followed the obligatory pathway P, the mixture leaves the fluidising apparatus via the flanged sleeve 109.

The rotor 111 is rotated by the electric motor 115 such that the peripheral velocity of the blades 114 is opposed to the velocity of the mixture in the obligatory pathway P.

The apparatus according to the invention has the advantage of rendering the mixture fluid in less time than the prior-art fluidising apparatus, by extending the distance in which the rotor provides mechanical energy to the fluid.

Furthermore, the apparatus according to the invention allows a greater amount of mechanical energy to be transferred to the mixture even with an angular velocity of the rotor that is less than that of the prior art.

A further advantage of the present invention lies in the simplicity of production and installation of the apparatus that makes installation possible even in already established plants.

The apparatus according to the invention enables the fluidising of dispersions/solutions of solid particles in a lipid phase for cosmetic purposes, such as creams and toothpaste, as well as for general food purposes, such as sauces and mustard.

Regarding the fluidising apparatus described above, specific, contingent demands can be satisfied by modifications, adaptations and substitution of elements with functional equivalents without leaving the scope of the protection of the invention as defined in the following claims.

What is claimed is:

1. Fluidising apparatus for fluidising a mixture of solid particles dispersed in a continuous lipid phase comprising:
    a casing delimiting an annular chamber having an inlet aperture and an outlet aperture;
    a rotor having a periphery, rotatably supported in the casing; and
    a baffle included in the annular chamber for rendering an arc of the annular chamber unusable and for making a remaining arc of the annular chamber that extends between the inlet aperture and the outlet aperture an obligatory pathway for the mixture, the baffle being formed with an opening for passage of the periphery of the rotor;
    obstacles to the flow of the mixture being provided in the obligatory pathway on the periphery of the rotor.

2. Apparatus according to claim 1, wherein the inlet aperture and outlet aperture are arranged on either side of the baffle, at an angle of a limited predetermined value.

3. Apparatus according to claim 2, wherein the angle is 90°.

4. Apparatus according to claim 1, further comprising motor means for rotating the rotor with a peripheral velocity opposed to the velocity of the mixture in the obligatory pathway.

5. Apparatus according to claim 1, wherein the obstacles are a plurality of peripheral blades, able to fluidise the mixture by providing mechanical energy in the form of cutting forces.

6. Apparatus according to claim 5, wherein the inlet aperture and outlet aperture are arranged on either side of the baffle, at an angle of a limited predetermined value.

7. Apparatus according to claim 6, wherein the angle is 90°.

8. Method for fluidising a mixture of solid particles dispersed in a continuous lipid phase, comprising the steps of:
    providing a fluidising apparatus comprising:
        a casing delimiting an annular chamber having an inlet aperture and an outlet aperture;
        a rotor having a periphery, rotatably supported in the casing;
        a baffle included in the annular chamber for rendering an arc of the annular chamber unusable and for making a remaining arc of the annular chamber that extends between the inlet aperture and the outlet aperture an obligatory pathway for the mixture, the baffle being formed with an opening for passage of the periphery of the rotor; and
        obstacles to the flow of the mixture being provided in the obligatory pathway on the periphery of the rotor;
    moving the mixture in the obligatory pathway from the inlet aperture to the outlet aperture; and
    rotating the rotor with a peripheral velocity opposed to the velocity of the mixture in the obligatory pathway.

9. Method according to claim 8, wherein the obstacles are a plurality of peripheral blades, able to fluidise the mixture by providing mechanical energy in the form of cutting forces.

* * * * *